United States Patent [19]

Tegen et al.

[11] Patent Number: 5,504,163
[45] Date of Patent: Apr. 2, 1996

[54] METHYLENE-BRIDGE AROMATIC POLYMER ADSORBENTS WITH INCREASED HYDROPHOBICITY

[75] Inventors: Marvin H. Tegen, Midland, Mich.; Kenneth C. Jones, Walnut Creek, Calif.

[73] Assignee: The Dow Chemical Company, Midland, Mich.

[21] Appl. No.: 360,551

[22] Filed: Dec. 21, 1994

[51] Int. Cl.$^6$ .............................. C08C 19/12; C08F 12/36
[52] U.S. Cl. ............................ 525/332.2; 525/332.5; 525/332.9; 525/333.4; 521/56; 521/146; 521/150; 521/905
[58] Field of Search ............................ 525/332.2, 332.5, 525/332.9, 333.4; 521/56, 146, 150, 905

[56] References Cited

U.S. PATENT DOCUMENTS

| | | | |
|---|---|---|---|
| 3,729,457 | 4/1973 | Davankov et al. | 260/88.2 |
| 4,074,035 | 2/1978 | Powers et al. | 525/374 |
| 4,191,813 | 3/1980 | Reed et al. | 525/330 |
| 4,263,407 | 4/1981 | Reed, Jr. | 521/33 |
| 4,568,700 | 2/1986 | Warshawsky et al. | 525/333.3 |
| 4,604,270 | 8/1986 | Tom | 423/262 |
| 4,950,332 | 8/1990 | Stringfield et al. | 127/55 |
| 5,079,274 | 1/1992 | Schneider et al. | 521/146 |
| 5,137,926 | 8/1992 | Maroldo et al. | 525/371 |
| 5,288,307 | 2/1994 | Goltz et al. | 95/143 |

OTHER PUBLICATIONS

V. A. Davankov and M. P. Tsyurupa, "Structure and Properties of Hypercrosslinked Polystyrene—The First Representative of a New Class of Polymer Networks," *Reactive Polymers*, Vo. 13 (1990), pp. 27–42.

Primary Examiner—Melvyn I. Marquis
Assistant Examiner—Randy Gulakowski

[57] ABSTRACT

Residual chloromethyl groups in methylene-bridged aromatic polymer adsorbents are susceptible to hydrolysis to benzyl alcohol groups and oxidation to benzoic acid groups. The introduction of these hydroxyl and carboxylic acid groups contributes to the water adsorption capacity or hydrophilicity of these adsorbents. Unfortunately, this hydrophilicity interferes with the utility of these resins as adsorbents for volatile organic compounds. By capping these residual chloromethyl groups with hydrophobic aromatic compounds prior to their opportunity to hydrolyze or oxidize, the hydrophobicity of methylene-bridged aromatic polymer adsorbents is increased and their utility for the absorption of organic compounds is enhanced.

9 Claims, No Drawings

METHYLENE-BRIDGE AROMATIC POLYMER ADSORBENTS WITH INCREASED HYDROPHOBICITY

FIELD OF INVENTION

The present invention concerns novel methylene-bridged aromatic polymer adsorbents having increased hydrophobicity, the process for their manufacture, and their use in the adsorption and recovery of volatile organic compounds. Such hydrophobic methylene-bridged aromatic polymer adsorbents are prepared by capping any residual chloromethyl groups remaining in a post-crosslinked chloromethylated aromatic copolymer with a hydrophobic aromatic compound.

BACKGROUND OF THE INVENTION

Both gel (U.S. Pat. No. 5,079,274) and lightly crosslinked macroporous (U.S. Pat. No. 5,288,307) aromatic polymer adsorbents, which have been post-crosslinked by the methylene-bridging of chloromethylated aromatic copolymers, have been used to adsorb and recover hydrocarbon fuel vapor emissions from fuel reservoirs and volatile organic compounds from gas streams. While the adsorption capacities for methylene-bridged aromatic polymer adsorbents typically surpass those of non-bridged adsorbents and activated carbon, they also suffer from one serious drawback, i.e., they have a tendency to competitively adsorb water at high relative humidities. Not only does this tendency to adsorb water reduce overall capacity for the volatile organic compound, but upon desorption the compound recovered is contaminated with water.

Chloromethylated aromatic copolymer is methylene-bridged by first swelling the resin and then contacting the resin with a Friedel-Crafts catalyst at a temperature sufficient to effect alkylation. Normally, a certain percentage of chloromethyl groups is prevented from reacting with a neighboring aromatic ring because of increasing rigidity of the polymer backbone due to methylene-bridging and because of resulting geometric constraints on any further bridging. Typically, about four percent of the chloromethyl groups remain unreacted. During additional processing or during intended use, the residual chloromethyl groups are hydrolyzed or oxidized to from hydrophilic sites, e.g., benzyl alcohol groups or benzoic acid groups. These hydrophilic sites favor the adsorption of water which can effectively compete with the adsorption of the volatile organic compound and can reduce the effective capacity of the adsorbent. Thus, it would be desirable to prevent the residual chloromethyl groups from being converted into hydrophilic sites. Ideally, the weight of water adsorbed at high relative humidity, i.e., humidities greater than 75 percent, should be less than about 10 weight percent based on the dry weight of the polymer adsorbent.

SUMMARY OF THE INVENTION

It has now been found that the hydrophobicity of methylene-bridged aromatic polymer adsorbents can be enhanced by capping any residual chloromethyl groups with hydrophobic aromatic compounds. Thus, the present invention concerns a hydrophobic polymer adsorbent comprising a methylene-bridged aromatic polymer adsorbent in which residual chloromethyl groups of the formula

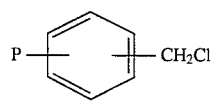

wherein

P is a polymer backbone, are converted into a group of the formula

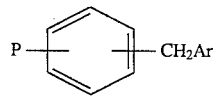

wherein

P is as previously defined, and

Ar is a substituted phenyl group of the formula

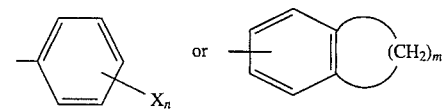

or a substituted naphthyl group of the formula

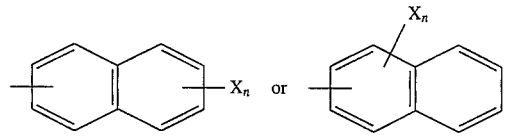

wherein

X is independently —H, —R, —OR or -hal,

R is a $C_1$–$C_{10}$ alkyl group or a substituted or unsubstituted phenyl group of the formula

wherein

Y is —H, a $C_1$–$C_4$ alkyl group or hal, n is an integer from 1 to 3, and m is an integer from 2 to 4.

In addition to the polymer adsorbents, the present invention also concerns a process for the preparation of hydrophobic methylene-bridged aromatic polymer adsorbents which comprises:

(a) contacting a chloromethylated aromatic copolymer with a swelling agent to expand the copolymer structure, (b) heating the swollen chloromethylated aromatic copolymer in the presence of a Friedel-Crafts catalyst to form methylene bridges by alkylation of neighboring aromatic rings with the chloromethyl groups, (c) adding at a temperature and in the presence of the Friedel-Crafts catalyst a hydrophobic aromatic compound of the formula ArH wherein ArH is a substituted benzene of the formula

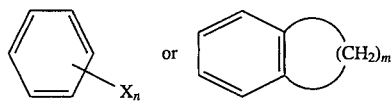

or a substituted naphthalene of the formula

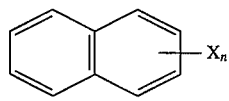

wherein

X is independently —H, —R, —OR or-hal,

R is a $C_1$–$C_{10}$ alkyl group or a substituted or unsubstituted phenyl group of the formula

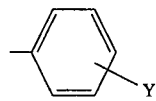

wherein

Y is —H, a $C_{1-C4}$ alkyl group or hal, n is an integer from 1 to 3, and m is an integer from 2 to 4, to react with any remaining chloromethyl groups, and (d) recovering the hydrophobic methylene-bridged polymer adsorbent.

Another aspect of the present invention concerns an improved process of adsorbing volatile organic materials from a vapor stream which comprises contacting the vapor stream with a hydrophobic methylene-bridged aromatic polymer adsorbent in which residual chloromethyl groups of the formula

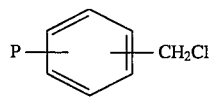

wherein

P is a polymer backbone, are converted into a group of the formula

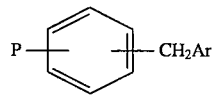

wherein

P is as previously defined, and

Ar is a substituted phenyl group of the formula

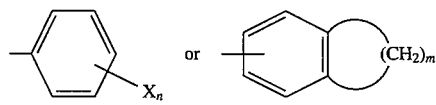

or a substituted naphthyl group of the formula

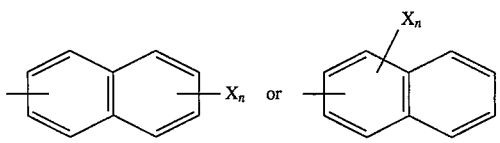

wherein

X is independently —H, —R, —OR or-hal,

R is a $C_1$–$C_{10}$ alkyl group or a substituted or unsubstituted phenyl group of the formula

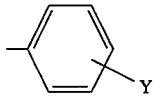

wherein

Y is —H, a $C_1$ –$C_4$ alkyl group or hal, n is an integer from 1 to 3, and m is an integer from 2 to 4.

The adsorbed organic materials can be recovered by desorption.

The hydrophobic methylene-bridged aromatic polymer adsorbents of the present invention have a water adsorption capacity of about 10 weight percent or less and adsorb much less water at high relative humidity, i.e., humidities greater than 75 percent, than do the corresponding polymer adsorbents in which any residual chloromethyl groups have not been capped with a hydrophobic aromatic compound. Under humid conditions, therefore, the polymer adsorbents of the present invention have higher capacities for volatile organic compounds.

DETAILED DESCRIPTION OF THE INVENTION

As used herein, the terms "halo" and "hal" refer to the halogens F, Cl, Br or I, and the terms "$C_1$–$C_4$ alkyl" and "$C_1$–$C_{10}$ alkyl" refer to straight-chained or branched, cyclic or aicyclic hydrocarbon groups of up to four carbon atoms and ten carbon atoms respectively, provided that all substituent groups are sterically compatible with each other. The term "sterically compatible" is employed to designate substituent groups which are not affected by steric hindrance as this term is defined in "Hawley's Condensed Chemical Dictionary," 11th edition, Van Nostrand Reinhold Co., New York, page 1093 (1987) which definition is as follows: "steric hindrance": A characteristic of molecular structure in which the molecules have a spatial arrangement of their atoms such that a given reaction with another molecule is prevented or retarded."

Sterically compatible may be further defined as reacting compounds having substituents whose physical bulk does not require confinement within volumes insufficient for the exercise of their normal behavior as discussed "Organic Chemistry" by D. J. Cram and G. Hammond, 2nd edition, McGraw-Hill Book Company, New York, page 215 (1964).

Methylene-bridged aromatic polymer adsorbents refer to adsorbent resins which are made from microporous or macroporous copolymers of a monovinyl aromatic monomer and a polyvinyl aromatic crosslinking monomer which have been chloromethylated and then post-crosslinked in a swollen state in the presence of a Friedel-Crafts catalyst. Such resins have been referred to as "hypercrosslinked" or macronee resins and their preparations and uses have been described, for example, by V. A. Davankov and M. P. Tsyurupa, *Reactive Polymers*, 13, 27 (1990) and in U.S. Pat.

Nos. 4,191,813; 4,263,407; 4,950,332; 5,079,274; and 5,288,307. Preferred monovinyl aromatic monomers are styrene and ethyl vinylbenzene; the preferred polyvinyl aromatic crosslinking monomer is divinylbenzene. Chloromethylation is preferably carried out by treatment of the copolymer with chloromethyl methyl ether in the presence of a Friedel-Crafts catalyst. Alternatively, chloromethyl groups can be incorporated into the copolymer by using vinylbenzyl chloride as a monovinyl aromatic monomer. Post-crosslinking, i.e., methylene bridging, is preferably accomplished by treatment with ethylene dichloride to first swell the chloromethylated aromatic copolymer followed by treatment with a Friedel-Crafts catalyst.

Chloromethylated aromatic copolymers refer to chloromethylated microporous or macroporous copolymers of a monovinyl aromatic monomer and a polyvinyl aromatic crosslinking monomer. The preferred monovinyl aromatic monomers are styrene and ethyl vinylbenzene. The preferred polyvinyl aromatic crosslinking monomer, which usually comprises from about 0.1 to about 20 weight percent of the combined monomers, is divinylbenzene. Chloromethyl groups may be incorporated into the chloromethylated aromatic copolymer either by treatment with a chloromethylation agent such as, for example, chloromethyl methyl ether, or by use of vinylbenzyl chloride as a portion of the monovinyl aromatic monomer. Chloromethylated aromatic copolymers typically contain from about 0.1 to about 0.9 and preferably from 0.6 to 0.8 chloromethyl groups per aromatic ring. Chloromethylations are described, for example, in U.S. Pat. Nos. 2,597,492; 2,629,710; 2,642,417; and 2,960,480.

When chloromethylated aromatic copolymers are post-crosslinked to form methylene bridges between neighboring aromatic rings, not all chloromethyl groups can react because of spatial considerations. Usually, from about 2 to 10 percent of the chloromethyl groups remain unreacted depending on the overall extent of chloromethylation, i.e., the ratio of chloromethyl groups to aromatic rings. In general, the greater the extent of chloromethylation, the greater the percentage of unreacted chloromethyl groups. In the novel methylene-bridged aromatic polymer adsorbents of the present invention, these unreacted chloromethyl groups are capped with hydrophobic aromatic compounds. In other words, the residual chloromethyl groups alkylate the hydrophobic aromatic compounds in a Friedel-Crafts alkylation which is not subject to the spatial or geometric constraints imposed on further methylene bridging with aromatic rings confined to the rigid hypercrosslinked polymer backbone. For this purpose, hydrophobic aromatic compounds refer to benzene and its derivatives which are from weakly deactivated to weakly to moderately activated towards electrophilic aromatic substitution as defined in *Organic Chemistry* by R. T. Morrison and R. N. Boyd, 6th Edition, Prentice Hall, Inc., Englewood Cliffs, N.J., p. 522 (1992). More particularly, the preferred hydrophobic aromatic compounds of those of formula ArH wherein ArH is a substituted benzene of the formula

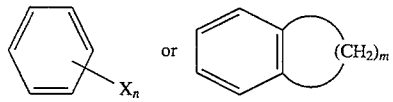

or a substituted naphthalene of the formula

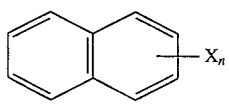

wherein

X is independently—H, —R, —OR or-hal,

R is a $C_1$-$C_{10}$ alkyl group or a substituted or unsubstituted phenyl group of the formula

wherein

Y is —H, a $C_1$-$C_4$ alkyl group or hal, n is an integer from 1 to 3, and m is an integer from 2 to 4.

Preferred are substituted benzenes in which X is —H, $C_1$-$C_{10}$ alkyl, or —$C_6H_5$ and naphthalene. Most preferred are substituted benzenes in which X is —$CH_3$ or —$CH_2CH_3$ and n is 1 or 2.

In preparing the hydrophobic methylene-bridged aromatic polymer adsorbents of the present invention, two important factors need to be kept in mind. First, both the methylene bridging and the capping with a hydrophobic aromatic compound are Friedel-Crafts alkylations and proceed under virtually identical reaction conditions. Therefore, it is most practical and efficient to conduct the reactions in sequence in the same reactor and to make use of the same solvent, the same catalyst and the same temperatures in a most economical fashion. Second, it is imperative that any residual chloromethyl groups be capped immediately after methylene-bridging before they are given an opportunity to hydrolyze or oxidize during the workup procedure. Otherwise, the hydrophilic sites will have already been formed.

Thus, the most preferred process for the manufacture of the hydrophobic methylene-bridged aromatic polymer adsorbents of the present invention requires the following steps: (a) swelling of the chloromethylated aromatic copolymer, (b) methylene-bridging the swollen copolymer in the presence of a Friedel-Crafts catalyst, (c) capping unreacted chloromethyl groups with a hydrophobic aromatic hydrocarbon in the presence of the same Friedel-Crafts catalyst, and (d) recovering the polymer adsorbent.

The chloromethylated aromatic copolymer is contacted with a swelling agent to expand the copolymer structure. Suitable swelling agents are solvents which are substantially inert during post-crosslinking of the copolymer and include chlorinated hydrocarbons, such as ethylene dichloride, methylene chloride, and propylene dichloride. The preferred swelling agent is 1,2-dichloroethane. The copolymer is allowed to swell in an excess amount of the swelling agent for at least 30 minutes. Preferably, the copolymer is contacted with the swelling agent for a time sufficient to substantially attain equilibrium with respect to swelling by the particular swelling agent employed. It is also generally convenient to dissolve the Friedel-Crafts catalyst employed in the subsequent post-crosslinking reaction within the swelling agent.

Once swollen, the chloromethylated copolymer is maintained at a temperature and in the presence of a Friedel-Crafts catalyst such that the bridging moieties (—$CH_2$—) are formed by reaction of the chloromethyl groups with a neighboring aromatic ring. Any Friedel-Crafts-type catalyst may be utilized to catalyze the post-crosslinking reaction, such as, for example, the acidic metal halides including aluminum chloride, stannic chloride, aluminum bromide, boron trifluoride, zinc chloride or ferric chloride. The catalyst is typically effective in amounts ranging from 0.001 to 50 and preferably from 5 to 30 percent by weight, based on weight of polymeric material. The optimum amount depends upon the reactants and conditions selected for carrying out the reaction. The mixture is heated to a temperature ranging from 20° C. to 180° C. for a period sufficient to post-crosslink the resin, preferably from 0.5 to 30 hours. More preferably, the temperature ranges from 60° C. up to the reflux temperature of the organic swelling liquid and the reaction period ranges from 0.5 to 8 hours. Most preferably, the temperature ranges from 60° C. to 85° C. The reaction temperatures and times may vary depending on the reactive species and catalyst in the reaction mixture.

After the methylene bridging is substantially complete, usually from about 1 to about 10 and preferably from 1.5 to 3 molar equivalents, based on the moles of unreacted chloromethyl groups, of the hydrophobic aromatic capping compound are added to the mixture. This may correspond to from 0.5 to 20 weight percent of aromatic hydrocarbon based on the total weight of polymer depending on the extent of chloromethylation. Alternatively, the hydrophobic aromatic hydrocarbon can be used as the solvent, either replacing the swelling solvent completely or being employed in substantial proportion in conjunction with the swelling solvent. The reaction temperature is maintained for a period ranging from 1 to 8 hours until capping is complete.

After the reaction is complete, the mixture is cooled and the methylene-bridged aromatic polymer adsorbent is separated from the liquid, washed and dried by conventional techniques. Due to the fact that the methylene-bridged aromatic polymer adsorbents produced in the process of the present invention are usually prepared from a styrene/divinylbenzene copolymer which has been prepared by a conventional suspension polymerization process, the resin particle size may be controlled over a wide range. Generally the size of the beads may range from 10 to 2000 micrometers (μm), preferably from 100 to 1200 μm, more preferably from 200 to 600 μm.

The methylene-bridged aromatic polymer adsorbents of the present invention are very useful in a method of adsorbing and recovering an organic material from a vapor stream. Exemplary of vapor streams are oxygen, nitrogen, carbon dioxide or mixtures thereof, such as air, which are mixed with an organic material. The adsorbents are particularly useful for recovering organic materials which are present in very small amounts, usually less than 5 and very often less than 1 percent by weight of the vapor stream.

In the practice of the present invention a gas stream, containing an organic material is caused to flow through a bed of the hydrophobic methylene-bridged aromatic polymer adsorbent which adsorbs the organic material. The flow of the gas continues until the content of the organic material in the vapor stream which flows out of the adsorbent bed exceeds an acceptable level. The organic material can be recovered and the adsorbent can be regenerated for continued use by desorbing the organic material from the adsorbent, e.g., by treatment with a purge gas at elevated temperature and/or reduced-pressure. The adsorption and desorption steps may be carried out in any conventional known adsorption apparatus and are described in more detail in U.S. Pat. No. 5,079,274. The most important impurities which can be separated from a gas such as air according to the method of the present invention are (a) hydrocarbons, preferably having 4 or more carbon atoms, or a mixture of such hydrocarbons such as gasoline, (b) halogenated hydrocarbons, in particular saturated and unsaturated halogenated hydrocarbons having 1 to 3 carbon atoms or aromatic hal ogenated hydrocarbons, (c) aldehydes and ketones, particularly those having less than 6 carbon atoms, and (d) alcohols, preferably those of from 1 to 6 carbon atoms.

The process for preparing the hydrophobic methylene-bridged aromatic polymer adsorbents and the method of adsorbing an organic material from a vapor stream according to the present invention are further illustrated by the following examples which should not be construed to limit the scope of the present invention.

EXAMPLE 1

Preparation of Hydrophobic, Methylene-Bridged Aromatic Polymer Adsorbents

A 100 gram (g) sample of macroporous styrene/divinylbenzene copolymer, having 6 weight percent divinylbenzene and polymerized in the presence of 42 weight percent iso-octane diluent, was swollen in 500 milliliters (mL) of chloromethyl methyl ether (CMME) for 30 minutes (min) at less than 20° C. To the stirring mixture was added 30 g of anhydrous $FeCl_3$ and the mixture was heated to 52° C. over 30 minutes. The reaction mixture was held at 52° C. for 2.5 hours (hr) before being cooled to 0° C. About 500 mL of methanol was added slowly to the cold mixture. The liquid wash was removed from the beads and a fresh 500 mL of methanol was added and the mixture was stirred for 30 min. The methanol was withdrawn and replaced with another 500 mL of methanol.

The methanol was removed and replaced with 1000 mL of 1,2-dichloroethane (EDC). The beads were allowed to swell in the EDC for 30 min before the EDC was removed and replaced with fresh EDC. After 30 minutes the EDC was again replaced with fresh EDC and 15 g of $FeCl_3$. After stirring for 30 min the mixture was heated to 80° C. over a period of 1 hr and then held at 80° C. for 3 hr. After 2 of the 3 hr had passed, 10 g of aromatic compound was added to the hot stirring reaction mixture. After the 3 hr were over the reaction mixture was cooled to 25° C. and the liquid removed. About 500 mL of methanol was added to the beads and the mixture was stirred for 30 min before the methanol was replaced with fresh methanol. The beads were washed twice more with 500 mL of methanol and once with 500 mL of water.

The water washed beads were re-suspended in water and 150 mL of 1N NaOH was added to the suspension. The stirring suspension was heated to 80° C. over 30 min and held at 80° C. for 3 hr before being cooled to room temperature and washed three times with water. The beads were air dried over night in a fume hood and then vacuum dried at 60° C. for 3 hr.

Approximately 5 g of polymer adsorbent that had been dried was placed on a moisture balance and dried to constant weight at 90° C. The adsorbent was transferred to a small glass column and 85 percent relative humidity air was passed through the adsorbent for two hours. The humidified adsorbent was transferred to a moisture balance and dried to determine the weight percent water uptake from the humid air. The results from using various hydrophobic aromatic capping compounds are tabulated in Table 1.

TABLE 1

Water Adsorption Capacity of Methylene-Bridged
Aromatic Polymer Adsorbents Capped with
Hydrophobic Aromatic Compounds

| Run | Aromatic Compound | % Water Adsorbed |
|---|---|---|
| a | chlorobenzene | 10.0 |
| b | cyclohexylbenzene | 9.8 |
| c | 1,2,3,4-tetrahydronaphthalene | 9.3 |
| d | anisole | 4.2 |
| e | naphthalene | 3.7 |
| f | biphenyl | 2.9 |
| g | mesitylene | 2.7 |
| h | diethylbenzene | 1.7 |
| i | toluene | 1.8 |

EXAMPLE 2

The procedure of Example 1 was repeated using toluene as the aromatic compound at a 5 percent (5 g) rather than a 10 percent level. After workup and drying the adsorbent had a water adsorption capacity of 4.7 percent.

EXAMPLE 3

The procedure of Example 1 was repeated using a gellular (microporous) styrene/divinylbenzene copolymer having 1.5 percent divinylbenzene as the starting material. The chloromethylation was conducted at 45° C. with 30 weight percent $FeCl_3$ for 3 hr. After bridging for 3 hr, the material was treated with 10 weight percent of the hydrophobic aromatic capping compound (based on weight of starting polymer) for 1 hr.

After workup and drying, the adsorbents had the water adsorption capacities listed in Table 2.

TABLE 2

Water Adsorption Capacity of Methylene-Bridged
Aromatic Polymer Adsorbents Capped with
Hydrophobic Aromatic Compounds

| Run | Aromatic Compound | % Water Adsorbed |
|---|---|---|
| a | 2,6-dichloroanisole | 2.5 |
| b | 2-ethylnaphthalene | 2.2 |
| c | 4-phenyltoluene | 1.9 |
| d | 2,6-dichlorotoluene | 1.7 |
| e | 1-phenyldecane | 1.6 |
| f | 2,5-dimethylanisole | 1.5 |
| g | toluene | 1.3 |

EXAMPLE 4

The procedure of Example 3 was repeated using ethylbenzene as the aromatic compound at a 2 weight percent rather than a 10 weight percent level. After workup and drying, the adsorbent had a water adsorption capacity of 1.6 percent.

EXAMPLE 5

Adsorption of Trichloroethylene from an Air
Stream by a Hydrophobic Aromatic
Methylene-Bridged Polymer Adsorbent Capped
with Toluene Approximately 5 g of dried polymeric adsorbent from Example $1_i$ was dried and transferred to a small glass column. Air containing 600 parts per million by volume of trichloroethylene was passed through the adsorbent at a rate of 103 ft/min (15 liters/min) and at relative humidities of 26 percent and 88 percent. The percent breakthrough of the trichloroethane was monitored as a function of time. The results are tabulated in Table 3.

TABLE 3

Percent Breakthrough of
Trichloroethylene from a Toluene-
Capped Adsorbent as a Function of
Time and Humidity

| | Rel. Hum. | |
|---|---|---|
| Time (min) | 26% | 88% |
| 0 | 0 | 0 |
| 5 | 0 | 0 |
| 10 | 0 | 0 |
| 15 | 0.1 | 0.1 |
| 20 | 0.4 | 0.5 |
| 25 | 2.1 | 3.5 |
| 30 | 11.7 | 20.6 |
| 35 | 44.6 | 65.3 |
| 40 | 83.1 | 93.2 |
| 45 | 96.8 | 99.0 |
| 50 | 99.5 | 99.9 |
| 55 | 99.9 | 100 |
| 60 | 100 | 100 |

What is claimes is:

1. A hydrophobic polymer adsorbent comprising a methylene-bridged aromatic polymer adsorbent in which residual chloromethyl groups of the formula

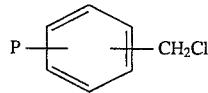

wherein

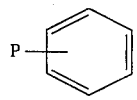

is a copolymer of a monovinyl aromatic monomer and a polyvinyl aromatic crosslinking monomer, are converted into a group of the formula

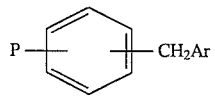

wherein

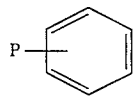

is as previously defined, and

Ar is a substituted phenyl group of the formula

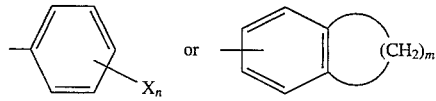

or a substituted naphythyl group of the formula

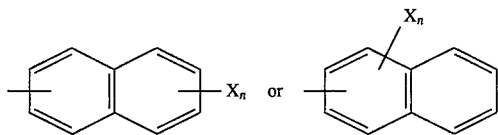

wherein
X is independently —H, —R, —OR or halogen,
R is a $C_1$–$C_{10}$ alkyl group of the formula unsubstituted phenyl group of the formula

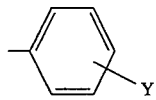

wherein
Y is —H, a $C_1$–$C_4$ alkyl group or halogen,
n is an integer from 1 to 3, and
m is an integer from 2 to 4.

2. The hydrophobic methylene-bridged aromatic polymer adsorbent of claim 1 in which Ar is a substituted phenyl group of the formula

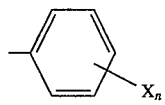

wherein
X is independently —H, a $C_1$–$C_{10}$ alkyl group or a —$C_6H_5$ group.

3. The hydrophobic methylene-bridged polymeric adsorbent of claim 2 in which X is —H, —$CH_3$ or —$CH_2CH_3$ and n is 1 or 2.

4. A process for the preparation of hydrophobic methylene-bridged aromatic polymer adsorbents which comprises:

(a) contacting a chloromethylated aromatic copolymer of a monovinyl aromatic monomer and a polyvinyl aromatic crosslinking monomer with a swelling agent to expand the copolymer structure, (b) heating the swollen chloromethylated aromatic copolymer in the presence of a Friedel-Crafts catalyst to form methylene bridges by alkylation of neighboring aromatic rings with the chloromethyl groups, (c) adding a hydrophobic aromatic compound of the formula ArH wherein
ArH is a substituted benzene of the formula

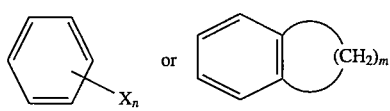

or a substituted naphthalene of the formula

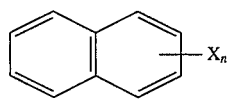

wherein
X is independently —H, —R, —OR or halogen,
R is a $C_1$–$C_{10}$ alkyl group or a substituted or unsubstituted phenyl group of the formula

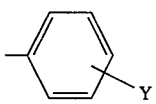

wherein
Y is —H, a $C_1$–$C_4$ alkyl group or halogen,
n is an integer from 1 to 3, and
m is an integer from 2 to 4, in the presence of the Friedel-Crafts catalyst and at a temperature sufficient to react with any remaining chloromethyl groups, and (d) recovering the hydrophobic methylene-bridged aromatic polymer adsorbent.

5. The process of claim 4 in which ArH is a substituted benzene of the formula

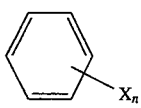

wherein
X is indepently —H, a $C_1$–$C_{10}$ alkyl group or a —$C_6H_5$ group.

6. The process of claim 5 in which X is —H, —$CH_3$ or —$CH_2CH_3$ and n is 1 or 2.

7. An improved process of adsorbing volatile organic materials from a vapor stream which comprises contacting the vapor stream with a hydrophobic methylene-bridged aromatic polymer adsorbent in which residual chloromethyl groups of the formula

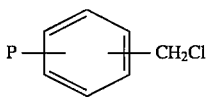

wherein

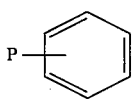

is a copolymer of a monovinyl aromatic monomer and a polyvinyl aromatic crosslinking monomer, have been converted into a group of the formula

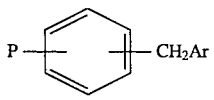

wherein

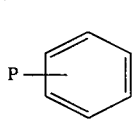

is as previously defined, and

Ar is a substituted phenyl group of the formula

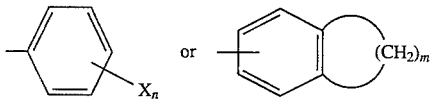

or a substituted naphthyl group of the formula

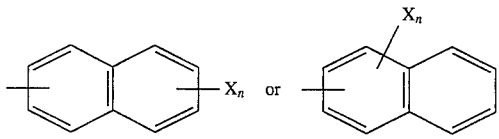

wherein

X is independently —H, —R, —OR or halogen,

R is a $C_1$–$C_{10}$ alkyl group or a substituted or unsubstituted phenyl group of the formula

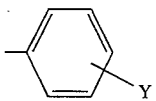

wherein

Y is —H, a $C_1$–$C_4$ alkyl group or halogen, n is an integer from 1 to 3, and m is an integer from 2 to 4.

8. The process of claim 7 in which Ar is a substituted phenyl group of the formula

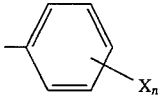

wherein

X is indepently —H, a $C_1$–$C_{10}$ alkyl group or a —$C_6H_5$ group.

9. The process of claim 8 in which X is —H, —$CH_3$ or —$CH_2CH_3$ and n is 1 or 2.

* * * * *

UNITED STATES PATENT AND TRADEMARK OFFICE
CERTIFICATE OF CORRECTION

PATENT NO. : 5,504,163

DATED : April 2, 1996

INVENTOR(S) : Tegen et al.

It is certified that error appears in the above-identified patent and that said Letters Patent is hereby corrected as shown below:

Col. 11, Lines 11-12, after the word "group" delete the phrase "of the formula unsubstituted phenyl group of the formula" and insert therefore --or a substituted or unsubstituted phenyl group of the formula--.

Col. 12, Line 30, delete "indepently" and insert therefore --independently--.

Col. 14, line19, delete "indepently" and insert therefore --independently--.

Signed and Sealed this

Fifteenth Day of May, 2001

Attest:

NICHOLAS P. GODICI

Attesting Officer

Acting Director of the United States Patent and Trademark Office